United States Patent Office 3,008,975
Patented Nov. 14, 1961

3,008,975
PROCESS FOR PREPARING SILICON ESTERS FROM HALOSILANES
Clement F. Schubert, Kenmore, N.Y., assignor to Union Carbide Corporation, a corporation of New York
No Drawing. Filed June 24, 1958, Ser. No. 744,058
18 Claims. (Cl. 260—448.8)

This invention relates to the preparation of silicon esters. More particularly, this invention relates to the preparation of silicon esters from halosilanes under reduced pressure.

Silicon esters of the general formula $R_nSi(OR')_{4-n}$, wherein R represents a hydrogen atom, a monovalent hydrocarbon radical, a cyano-substituted monovalent hydrocarbon radical, or a halogen-substituted monovalent hydrocarbon radical, R' represents a monovalent hydrocarbon radical, a hydroxy-substituted monovalent hydrocarbon radical, or a beta-methoxyethyl radical, and $n$ is an integer having a value of from 1 to 3, inclusive, are known in the art. These compounds are generally prepared by the reaction of alcohols with halosilanes. This may be illustrated by the following graphic equation which depicts the reaction between an alcohol and a chlorosilane.

(1) $R_nSiCl_{4-n} + R'OH \rightarrow R_nSi(OR')_{4-n} + HCl$

The above-depicted reaction is accompanied by certain undesirable side reactions. Hydrogen chloride liberated by this reaction attacks the starting materials and products present to produce undesirable by-products, thus lowering the yield of the desired reaction product. For example, liberated hydrogen chloride reacts with alcohol to produce a hydrocarbon chloride and water. This results in the loss of considerable alcohol. Furthermore, water formed by this side reaction hydrolyzes the chlorosilane, producing undesirable polysiloxanes and generating more hydrogen chloride. The reactions described may be illustrated by the following graphic equations:

(2) $HCl + R'OH \rightarrow R'Cl + H_2O$ (3) $H_2O + R_nSiCl_{4-n} \rightarrow R_nSiO_{\frac{4-n}{2}} + HCl$

In addition to reacting with alcohol, liberated hydrogen chloride in the presence of water attacks certain acid-sensitive groups which may be present in the silane. Thus, for example, hydrogen chloride causes cleavage of the silicon-carbon bond of certain alkenylsilanes, such as allyltrichlorosilane and allyltriethoxysilane. Similarly, hydrogen chloride cleaves the silicon-hydrogen bond of certain silanes, such as trichlorosilane and triethoxysilane. These reactions may be illustrated by the following graphic equations:

(4) $CH_2=CHCH_2Si(OEt)_3 + HCl$
$\rightarrow CH_2=CHCH_3 + ClSi(OEt)_3$ (5) $HSi(OEt)_3 + HCl \rightarrow H_2 + ClSi(OEt)_3$ In addition to reacting with the starting materials and products, liberated hydrogen chloride may also catalyze other undesired side reactions. Illustrative of these undesired side reactions are the following graphic equations:

(6) $(C_6H_5)_2SiCl_2 + R'OH \xrightarrow{H+} C_6H_6 + C_6H_5Si(OR')_3 + HCl$
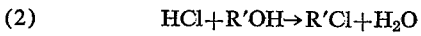

(7) $NCCH_2CH_2Si(OR')_3 + R'OH + H_2O \xrightarrow{H+}$
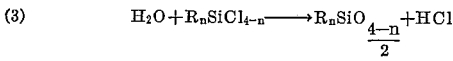

$R'O\overset{O}{\underset{\|}{C}}CH_2CH_2Si(OR')_3 + NH$

Various means have been developed by the prior art to minimize these undesired side reactions by reducing hydrogen chloride concentration. Thus, improved yields of silicon esters have been obtained by carrying out the esterification in the presence of a reagent capable of combining with hydrogen chloride, such as pyridine, quinoline or ammonia. However, this method is not desirable for commercial scale operations because of the expense involved, and the difficulty in removing the precipitated chloride salt.

Another prior art technique of reducing hydrogen chloride concentration has been to carry out the esterification in the presence of a solvent which has a low tolerance for hydrogen chloride, such as, for example, carbon tetrachloride, benzene, n-hexane and the like. However, the large volume of solvent required for such purpose results in added expense and seriously decreases the yield of product obtainable from a given size reactor.

According to my invention, silicon esters are produced by forming a mixture of a halosilane and an alcohol, reducing the pressure on said mixture to at least about 200 mm. Hg absolute pressure, and maintaining said mixture at a temperature at which the halosilane and alcohol react in liquid phase to produce a silicon ester.

When the reaction is conducted below the indicated pressure, not only are undesired side reactions substantially eliminated and unexpectedly high yields of silicon esters obtained, but a more complete esterification of halosilane is effected, and silicon esters having a lower residual halide content than heretofore obtainable are produced. It has also been unexpectedly found that when the reaction is conducted below 200 mm. Hg absolute pressure, reactivity between the alcohol and halosilane is accelerated and reaction time considerably shortened.

Although any pressure below about 200 mm. Hg absolute pressure may be employed in the process of my invention, absolute pressures below about 50 mm. Hg have been found particularly effective.

The temperatures employed in the process of this invention may vary widely, so long as under the conditions of reaction, the halosilane and alcohol are maintained in liquid phase. In general, temperatures between 0° C. and 100° C., but preferably between 20° C. and 70° C., can be employed. Temperatures both above and below the broadly disclosed range can also be employed, so long as the halosilane and alcohol are maintained in liquid phase; however, no commensurate advantage is obtained thereby.

As disclosed above, one by-product of the esterification is water. Water is a highly undesirable by-product since it hydrolyzes halosilane present in the system to produce undesirable polysiloxanes, and combines with hydrogen halide to produce hydrohalic acid, which attacks certain acid-sensitive groups which may be present in the silane, as illustrated by Equations 4 and 5, and catalyzes other undesirable side reactions, as illustrated by Equations 6 and 7.

It is, therefore, desirable to remove water from the reaction system. In the most preferred embodiment of this invention, this is accomplished by controlling the conditions of temperature and pressure so that for any given pressure below 200 mm. Hg absolute pressure, the temperature is such that water will be evaporated from the system. The increased yields obtained when operating under these conditions are quite surprising, since it is quite unexpected that the small amount of water present in the system would so hinder the esterification reaction.

The halosilanes employed in this invention are well known in the art, and are of the type $R_nSiX_{4-n}$, wherein R represents a hydrogen atom, a monovalent hydrocarbon radical, such as methyl, allyl, amyl, isopropyl, isobutyl, phenyl, diphenyl and the like, a cyano-substituted monovalent hydrocarbon radical, such as cyanoethyl, cyanopropyl and the like, or a halogen-substituted monovalent hydrocarbon radical, such as chlorovinyl, chlorophenyl and the like; X represents a halogen atom, such as fluorine, chlorine or bromine; and $n$ is an integer having a value of from 1 to 3, inclusive. When in the general formula $n$ is greater than 1, R may represent the same or different radicals. The reaction of this invention may be carried out using one of the above-defined silanes or a mixture of them.

Typical halosilanes which may be employed as starting materials in the process of this invention include trichlorosilane, diphenyldichlorosilane, beta-cyanoethyltrichlorosilane and allyltrichlorosilane.

This process is especially useful when halosilanes are employed which contain radicals which are unstable in the presence of hydrogen halide acids. However, according to this invention, improved yields of silicon esters are obtained, and reaction times considerably shortened, even when halosilanes are employed which contain radicals which are stable in the presence of hydrogen halide acids. Furthermore, whether the halosilanes employed contain radicals which are stable in the presence of hydrogen halide acids or not, in the practice of the process of this invention, a more complete esterification of halosilane is effected, and silicon esters having a lower residual halide content than heretofore obtainable are produced.

The alcohols employed in this invention are of the type R'OH, wherein R' represents a monovalent hydrocarbon radical, such as methyl, allyl, amyl, isopropyl, isobutyl, phenyl, diphenyl and the like, a hydroxy-substituted monovalent hydrocarbon radical, such as beta-hydroxyethyl, para-hydroxyphenyl and the like, or a beta-methoxyethyl radical.

Typical alcohols which may be employed as starting materials in the process of this invention include methanol, ethanol, isopropanol and beta-methoxyethanol.

The silicon esters prepared in accordance with this invention are useful in the production of polysiloxanes, which materials are used commercially as water repellents, rubbers, etc.

It will be apparent to one skilled in the art that certain variations and modifications in the described process may be effected without departing from the spirit of the present invention. The following examples of my invention are set forth for purposes of illustration, so that those skilled in the art may better understand my invention, and it should be understood that they are not to be construed as limiting my invention.

*Example I–A*

Two hundred and three and three-tenth (203.3) grams of trichlorosilane (1.5 moles) were added to a three-necked, one-liter glass flask fitted with a stirrer, a thermometer, a dropping funnel, and a water-cooled reflux condenser vented to the atmosphere. Two hundred and seven (207) grams of ethanol (4.5 moles) were added dropwise to the trichlorosilane by means of the dropping funnel with continuous stirring over the course of one hour. During the addition, the temperature dropped below 0° C. After the addition of ethanol was complete, the contents of the flask were heated to room temperature by means of an electrical heating jacket. The chloride content of the reaction mixture, as determined by titration with standard sodium hydroxide solution on a one gram sample, was found to be 22.8%. After heating the reaction mixture to 40° C., the chloride content of the mixture, as determined by titration with standard sodium hydroxide solution on a one gram sample, was then found to be 4.2%. An additional 13 grams of ethanol (0.28 mole) were then added to the mixture. The mixture was distilled at 50 mm. Hg absolute pressure and 207 grams of distillate boiling between 68–80° C. were collected. When a one gram sample of distillate was treated with 50% sodium hydroxide solution, 75 ml. of hydrogen gas were evolved. This indicated the presence of 0.54 gram of triethoxysilane, representing an overall yield of about 45% of theoretical.

*Example I–B*

Two hundred and three and three-tenth (203.3) grams of trichlorosilane (1.5 moles) were added to a three-necked, one-liter glass flask fitted with a stirrer, a thermometer, a dropping funnel, and a water-cooled reflux condenser vented to the atmosphere. One hundred and thirty-eight and one-half (138.5) grams of ethanol (3 moles) were added dropwise to the trichlorosilane by means of the dropping funnel with continuous stirring over the course of sixty-eight minutes. During the addition, the temperature dropped to nearly 0° C. The reflux condenser was then connected to a vacuum pump, and the contents of the flask subjected to 100 mm. Hg absolute pressure for about one hour. The chloride content of the reaction mixture, as determined by titration with standard sodium hydroxide solution on a one gram sample, was found to be 20.3%. An additional 55 grams of ethanol (1.2 moles) were added dropwise to the mixture at 100 mm. Hg absolute pressure over the course of fifty-five minutes. After heating the mixture to 40° C. at 100 mm. Hg absolute pressure, the chloride content of the mixture, as determined by titration with standard sodium hydroxide solution on a one gram sample, was then found to be 1%. An additional 2.7 grams of ethanol (0.06 mole) were then added to the mixture. The mixture was distilled at 50 mm. Hg absolute pressure, and 173 grams of distillate boiling between 61–90° C. were collected. When a one gram sample of distillate was treated with 50% sodium hydroxide solution, 138 ml. of hydrogen gas were involved, indicating the sample was essentially pure triethoxysilane. This represented a yield of about 68% of theoretical, as compared to the 45% yield obtained when operating at atmospheric pressure.

*Example II–A*

Two hundred (200) grams of diphenyldichlorosilane (0.79 mole) were added to a three-necked, one-liter glass flask fitted with a stirrer, a thermometer, a dropping funnel, and a water-cooled reflux condenser vented to the atmosphere. One hundred and ten (110) grams of ethanol (2.38 moles) were added dropwise to the diphenyldichlorosilane by means of the dropping funnel with continuous stirring over the course of two hours. During the addition, the temperature varied between 16° C. and 25° C. After the addition of ethanol was complete, the contents of the flask were heated to 110° C. The chloride content of the reaction mixture, as determined by titration with standard sodium hydroxide solution on a one gram sample, was found to be 0.85%. The mixture was distilled under reduced pressure, and 171 grams of diphenyldiethoxysilane were collected. This represented a yield of about 80% of theoretical.

*Example II–B*

Two hundred (200) grams of diphenyldichlorosilane (0.79 mole) were added to a three-necked, one-liter glass flask fitted with a stirrer, a thermometer, a dropping funnel, and a water-cooled reflux condenser connected to a vacuum pump. One hundred and ten (110) grams of ethanol (2.38 moles) were added dropwise to the diphenyldichlorosilane by means of the dropping funnel with continuous stirring over the course of two hours, with the contents of the flask subjected to 50 mm. Hg absolute pressure. During the addition, the temperature varied between 16° C. and 25° C. After the addition of ethanol was complete, the contents of the flask were heated to 110° C. The chloride content of the reaction mixture, as determined by titration with standard sodium hydroxide solution on a one gram sample, was found to be 0.2%. The mixture was distilled under reduced pressure, and 185 grams of diphenyldiethoxysilane were collected. This represented a yield of about 86.2% of theoretical.

Example III–A

One hundred and fifty (150) grams of beta-cyanoethyltrichlorosilane (1 mole) were added to a one-liter glass flask fitted with a stirrer, a dropping funnel, a thermocouple, and a tube vented to the atmosphere. One hundred and twenty-two (122) grams of ethanol (2.66 moles) were added dropwise to the beta-cyanoethyltrichlorosilane by means of the dropping funnel with continuous stirring over the course of two hours. During the addition, the temperature varied between 25° C. and 32° C. After the addition of ethanol was complete, the contents of the flask were heated to 100° C. The chloride content of the reaction mixture, as determined by titration with standard sodium hydroxide solution on a one gram sample, was found to be 5.3%. An additional 77 grams of ethanol (1.67 moles) were added to the mixture, and ammonia passed into the reaction flask at 24° C. until the reaction mixture was saturated. The contents of the flask were filtered to remove NH$_4$Cl. An attempt was made to distil the filtrate, but at 220° C. and 30 mm. Hg absolute pressure, the filtrate gelled and very little product was obtained.

Example III–B

One hundred and fifty (150) grams of beta-cyanoethyltrichlorosilane (1 mole) were added to a one-liter glass flask fitted with a stirrer, a dropping funnel, a thermocouple, and a tube connected to a vacuum pump. One hundred and twenty-two (122) grams of ethanol (2.66 moles) were added dropwise to the beta-cyanoethyltrichlorosilane by means of the dropping funnel with continuous stirring over the course of two hours, with the contents of the flask subjected to 25 mm. Hg absolute pressure at 25° C. After the addition of ethanol was complete, the contents of the flask were heated to 100° C. at 25 mm. Hg absolute pressure. The chloride content of the reaction mixture, as determined by titration with standard sodium hydroxide solution on a one gram sample, was found to be 0.6%. An additional 67 grams of ethanol (1.45 moles) were added to the mixture, and ammonia passed into the reaction flask at 25° C. until the reaction mixture was saturated. The contents of the flask were filtered to remove NH$_4$Cl. The filtrate was distilled at 28 mm. Hg absolute pressure, and 153 grams of beta-cyanoethyltriethoxysilane boiling at 133° C. were collected. This represented a yield of about 88.5% of theoretical.

Example III–C

Five hundred (500) grams of beta-cyanoethyltrichlorosilane (3.33 moles) were added to a one-liter glass flask fitted with a stirrer, a dropping funnel, a thermocouple, and a tube connected to a vacuum pump. Three hundred and seventy (370) grams of ethanol (8.04 moles) were added dropwise to the beta-cyanoethyltrichlorosilane by means of the dropping funnel with continuous stirring over the course of three hours, with the contents of the flask subjected to between 45 and 56 mm. Hg absolute pressure. During the addition, the temperature varied between 18° C. and 0° C. After the addition of ethanol was complete, the contents of the flask were heated to 40° C. at 42 mm. Hg absolute pressure. The chloride content of the reaction mixture, as determined by titration with standard sodium hydroxide solution on a one gram sample, was found to be 8.18%. One-third of the reaction mixture and 42 grams of ethanol (0.9 mole) were then heated to 50° C. at 20 mm. Hg absolute pressure. The chloride content of the mixture, as determined by titration with standard alkali solution on a one gram sample, was then found to be 2.27%. The mixture was distilled at 3 mm. Hg absolute pressure, and 171 grams of beta-cyanoethyltriethoxysilane boiling at 88–93° C. were collected. This represented a yield of about 85.5% of theoretical.

Example III–D

Five hundred (500) grams of beta-cyanoethyltrichlorosilane (3.33 moles) were added to a one-liter glass flask fitted with a stirrer, a dropping funnel, a thermocouple, and a tube connected to a vacuum pump. Four hundred and ninety (490) grams of ethanol (10.6 moles) were added dropwise to the beta-cyanoethyltrichlorosilane by means of the dropping funnel with continuous stirring over the course of 2¾ hours, with the contents of the flask subjected to between 73 and 98 mm. Hg absolute pressure. During the addition, the temperature varied between 26° C. and 6° C. After the addition of ethanol was complete, the contents of the flask were heated to 48° C. at 98 mm. Hg absolute pressure. The chloride content of the reaction mixture, as determined by titration with standard sodium hydroxide solution on a one gram sample, was found to be 4.26%. The formation of a white precipitate (NH$_4$Cl) indicated decomposition of the cyano groups of the silane. The contents of the flask were filtered to remove NH$_4$Cl. Two hundred and three grams of the filtrate were then distilled at 89 mm. Hg absolute pressure, and 121 grams of beta-cyanoethyltriethoxysilane boiling at 133° C. were collected. This represented a yield of about 69.6% of theoretical.

Example IV–A

Six hundred (600) grams of allyltrichlorosilane (3.43 moles) were added to a three-necked, two-liter glass flask fitted with a stirrer, a dropping funnel, a thermocouple, and a tube vented to the atmosphere. Five hundred and twenty (520) grams of ethanol (11.3 moles) were added dropwise to the allyltrichlorosilane by means of the dropping funnel with continuous stirring over the course of two hours. During the addition, the temperature dropped to nearly 0° C. After the addition of ethanol was complete, the contents of the flask were heated to 94° C. The chloride content of the reaction mixture, as determined by titration with standard sodium hydroxide solution on a one gram sample, was found to be 6.5%. Ammonia was passed into the reaction flask at 23–30° C. until the reaction mixture was saturated. The contents of the flask were filtered to remove NH$_4$Cl. The filtrate was distilled at 28 mm. Hg absolute pressure and 670 grams of distillate boiling at 101–114° C. were collected. Infrared absorption spectrum and bromine absorption showed less than 20% allyltriethoxysilane to be present.

Example IV–B

Six hundred (600) grams of allyltrichlorosilane (3.43 moles) were added to a three-necked, two-liter glass flask fitted with a stirrer, a thermocouple, a dropping funnel, and a tube connected to a vacuum pump. Five hundred and twenty (520) grams of ethanol (11.3 moles) were added dropwise to the allyltrichlorosilane by means of the dropping funnel with continuous stirring over the course of two hours, with the contents of the flask subjected to 50 mm. Hg absolute pressure. During the addition, the temperature dropped to nearly 0° C. After the addition of ethanol was complete, the contents of the flask were heated to 92° C. The chloride content of the reaction mixture, as determined by titration with standard sodium hydroxide solution on a one gram sample, was found to be 0.46%. An additional 25 grams of ethanol (0.54 mole) were added to the mixture, and ammonia passed into the reaction flask at 15–22° C. until the reaction mixture was saturated. The contents of the flask were filtered to remove NH$_4$Cl. The filtrate was distilled at 28 mm. Hg absolute pressure, and 585 grams of allyltriethoxysilane boiling at 82–84° C. were collected. This represented a yield of about 84% of theoretical.

What is claimed is:
1. A process for producing silicon esters of the general formula

$$R_nSi(OR')_{4-n}$$

wherein R is a member of the group consisting of hydrogen, monovalent hydrocarbon radicals, cyano-substituted monovalent hydrocarbon radicals and halogen-substituted monovalent hydrocarbon radicals; R' is a member of the group consisting of monovalent hydrocarbon radicals, hydroxy-substituted monovalent hydrocarbon radicals and beta-methoxyethyl; and $n$ is an integer having a value of from 1 to 3, inclusive, which comprises forming a mixture consisting essentially of a halosilane of the general formula $R_nSiX_{4-n}$, wherein R and $n$ are as above defined and X is a halogen atom, and an alcohol of the general formula R'OH, wherein R' is as above-defined, reducing the pressure on said mixture to at least about 200 mm. Hg absolute pressure, and maintaining said mixture at a temperature at which said halosilane and said alcohol react in liquid phase to produce said silicon ester.

2. A process for producing silicon esters of the general formula $$R_nSi(OR')_{4-n}$$

wherein R is a member of the group consisting of hydrogen, monovalent hydrocarbon radicals, cyano-substituted monovalent hydrocarbon radical and halogen-substituted monovalent hydrocarbon radicals; R' is a member of the group consisting of monovalent hydrocarbon radicals, hydroxy-substituted monovalent hydrocarbon radicals and beta-methoxyethyl; and $n$ is an integer having a value of from 1 to 3, inclusive, which comprises forming a mixture consisting essentially of a halosilane of the general formula $R_nSiX_{4-n}$, wherein R and $n$ are as above defined and X is a halogen atom, and an alcohol of the general formula R'OH, wherein R' is as above defined, reducing the pressure on said mixture to at least about 50 mm. Hg absolute pressure, and maintaining said mixture at a temperature at which asid halosilane and said alcohol react in liquid phase to produce said silicon ester.

3. A process for producing silicon esters of the general formula $$R_nSi(OR')_{4-n}$$

wherein R is a member of the group consisting of hydrogen, monovalent hydrocarbon radicals, cyano-substituted monovalent hydrocarbon radicals and halogen-substituted monovalent hydrocarbon radicals; R' is a member of the group consisting of monovalent hydrocarbon radicals, hydroxy-substituted monovalent hydrocarbon radicals and beta-methoxyethyl; and $n$ is an integer having a value of from 1 to 3, inclusive, which comprises forming a mixture consisting essentially of a halosilane of the general formula $R_nSiX_{4-n}$, wherein R and $n$ are as above defined and X is a halogen atom, and an alcohol of the general formula R'OH, wherein R' is as above defined, reducing the pressure on said mixture to at least about 200 mm. Hg absolute pressure, and controlling the conditions of temperature and pressure so that for any given pressure below about 200 mm. Hg absolute pressure, the temperature is such that water will be evaporated from the system and said halosilane and said alcohol react in liquid phase to produce said silicon ester.

4. A process for producing silicon esters of the general formula $$R_nSi(OR')_{4-n}$$

wherein R is a member of the group consisting of hydrogen, monovalent hydrocarbon radicals, cyano-substituted monovalent hydrocarbon radicals and halogen-substituted monovalent hydrocarbon radicals; R' is a member of the group consisting of monovalent hydrocarbon radicals, hydroxy substituted monovalent hydrocarbon radicals and beta-methoxyethyl; and $n$ is an integer having a value of from 1 to 3, inclusive, which comprises forming a mixture consisting essentially of a halosilane of the general $R_nSiX_{4-n}$, wherein R and $n$ are as above defined and X is a halogen atom, and an alcohol of the general formula R'OH, wherein R' is as above defined, reducing the pressure on said mixture to at least about 50 mm. Hg absolute pressure, and controlling the conditions of temperature and pressure so that for any given pressure below about 50 mm. Hg absolute pressure, the temperature is such that water will be evaporated from the system and said halosilane and said alcohol react in liquid phase to produce said silicon ester.

5. A process as defined in claim 2, wherein R' is a monovalent aliphatic hydrocarbon radical.

6. A process as defined in claim 3, wherein R' is a monovalent aliphatic hydrocarbon radical.

7. A process as defined in claim 5, wherein X is a chlorine atom.

8. A process as defined in claim 6, wherein X is a chlorine atom.

9. A process as defined in claim 5, wherein R is a cyano-substituted monovalent hydrocarbon radical.

10. A process as defined in claim 6, wherein R is a cyano-substituted monovalent hydrocarbon radical.

11. A process for producing beta-cyanoethyltriethoxysilane which comprises forming a mixture consisting essentially of beta-cyanoethyltrichlorosilane and ethanol, reducing the pressure on said mixture to at least about 50 mm. Hg absolute pressure, and maintaining said mixture at a temperature at which said beta-cyanoethyltrichlorosilane and said ethanol react in liquid phase to produce said beta-cyanoethyltriethoxysilane.

12. A process for producing beta-cyanoethyltriethoxysilane which comprises forming a mixture consisting essentially of beta-cyanoethyltrichlorosilane and ethanol, reducing the pressure on said mixture to at least about 200 mm. Hg absolute pressure, and controlling the conditions of temperature and pressure so that for any given pressure below about 200 mm. Hg absolute pressure, the temperature is such that water will be evaporated from the system and said beta-cyanoethyltrichlorosilane and said ethanol react in liquid phase to produce said beta-cyanoethyltriethoxysilane.

13. A process for producing triethoxysilane which comprises forming a mixture consisting essentially of trichlorosilane and ethanol, reducing the pressure on said mixture to at least about 50 mm. Hg absolute pressure, and maintaining said mixture at a temperature at which said trichlorosilane and said ethanol react in liquid phase to produce said triethoxysilane.

14. A process for producing triethoxysilane which comprises forming a mixture consisting essentially of trichlorosilane and ethanol, reducing the pressure on said mixture to at least about 200 mm. Hg absolute pressure, and controlling the conditions of temperature and pressure so that for any given pressure below about 200 mm. Hg absolute pressure, the temperature is such that water will be evaporated from the system and said trichlorosilane and said ethanol react in liquid phase to produce said triethoxysilane.

15. A process for producing diphenyldiethoxysilane which comprises forming a mixture consisting essentially of diphenyldichlorosilane and ethanol, reducing the pressure on said mixture to at least about 50 mm. Hg absolute pressure, and maintaining said mixture at a temperature at which said diphenyldichlorosilane and said ethanol react in liquid phase to produce said diphenylethoxysilane.

16. A process for producing diphenyldiethoxysilane which comprises forming a mixture consisting essentially of diphenyldichlorosilane and ethanol, reducing the pressure on said mixture to at least about 200 mm. Hg absolute pressure, and controlling the conditions of temperature and pressure so that for any given pressure below about 200 mm. Hg absolute pressure, the temperature is such that water will be evaporated from the system and said diphenyldichlorosilane and said ethanol react in liquid phase to produce said diphenyldiethoxysilane.

17. A process for producing allyltriethoxysilane which comprises forming a mixture consisting essentially of allyltrichlorosilane and ethanol, reducing the pressure on said mixture to at least about 50 mm. Hg absolute pressure, and maintaining said mixture at a temperature at which said allyltrichlorosilane and said ethanol react in liquid phase to produce said allyltriethoxysilane.

18. A process for producing allyltriethoxysilane which comprises forming a mixture consisting essentially of allyltrichlorosilane and ethanol, reducing the pressure on said mixture to at least about 200 mm. Hg absolute pressure, and controlling the conditions of temperature and pressure so that for any given pressure below about 200 mm. Hg absolute pressure, the temperature is such that water will be evaporated from the system and said allyltrichlorosilane and said ethanol react in liquid phase to produce said allyltriethoxysilane.

References Cited in the file of this patent

UNITED STATES PATENTS

| 2,532,583 | Tyran | Dec. 5, 1950 |
| 2,906,768 | Haluska | Sept. 29, 1959 |

FOREIGN PATENTS

| 862,895 | Germany | Jan. 15, 1953 |
| 1,116,726 | France | Dec. 31, 1954 |

OTHER REFERENCES

Kipping et al.: "Jour. Chem. Soc.," vol. 130 (1927), pp. 2734–7.

Chem. Abs., vol. 45, pp. 1863a and 7973c (1951).

Chem. Abs., vol. 51, pp. 11 and 238 (1957).